United States Patent [19]

Gardner et al.

[11] Patent Number: 5,050,954
[45] Date of Patent: Sep. 24, 1991

[54] MULTIPORT OPTICAL DEVICES

[75] Inventors: William B. Gardner, Duluth; Jane F. Kuhl; Calvin M. Miller, both of Atlanta, all of Ga.; Linn F. Mollenauer, Colts Neck, N.J.

[73] Assignee: AT&T Bell Laboratories, Murray Hill, N.J.

[21] Appl. No.: 463,730

[22] Filed: Jan. 12, 1990

[51] Int. Cl.$^5$ ............................ G02B 6/32; G02B 6/26
[52] U.S. Cl. ................................. 385/16; 385/33; 359/127
[58] Field of Search ............... 350/96.10, 96.15, 96.16, 350/96.18, 96.19, 360; 250/226, 231 R; 356/352, 358, 361

[56] References Cited

U.S. PATENT DOCUMENTS

| | | | |
|---|---|---|---|
| 4,111,524 | 9/1978 | Tomlinson | 350/96.19 |
| 4,213,677 | 7/1980 | Sugimoto et al. | 350/96.18 |
| 4,253,728 | 3/1981 | Venkatesan | 350/96.15 |
| 4,525,067 | 6/1985 | Hernandez | 350/346 |
| 4,533,247 | 7/1985 | Epworth | 356/346 |
| 4,550,975 | 11/1985 | Levinson et al. | 350/96.18 |
| 4,768,849 | 9/1988 | Hicks, Jr. | 350/96.15 |
| 4,813,756 | 3/1989 | Frenkel et al. | 350/96.18 |
| 4,830,451 | 5/1989 | Stone | 350/96.15 |
| 4,834,485 | 5/1989 | Lee | 350/96.18 X |

OTHER PUBLICATIONS

Tomlinson, *Applied Optics*, vol. 19, No. 7, Apr. 2, 1980, pp. 1127-1138.
Frenkel et al., *Electronics Letters*, 4th Feb. 1988, vol. 24, No. 3, pp. 159-161.

*Primary Examiner*—Akm Ullah

[57] ABSTRACT

A multi-port optical device for transferring optical signals, or portion of optical signals, from one transmission element to another is disclosed. The inventive optical device comprises a pair of graded index lenses having an interposed Fabry Perot etalon. Moreover, the functionality of the device may be modified by varying the transmission characteristics of the etalon, which may be effected by varying the optical path length of the etalon. In operation, the optical device utilizes the graded index lenses as image transfer lenses between transmission elements wherein wavelength selectivity therebetween is afforded by the filtering mechanism associated with the etalon. The optical device may be used as a wavelength multiplexer or as an optical splitter. Moreover, by utilizing a piezoelectric transducer, the optical device may be converted to operate as an optical switch.

35 Claims, 1 Drawing Sheet

MULTIPORT OPTICAL DEVICES

TECHNICAL FIELD

This invention relates to optical communications systems, and, in particular, to multiport optical devices for transferring optical signals, or portions of optical signals, from one transmission element to another.

BACKGROUND OF THE INVENTION

With the growth of optical communications systems, the need for various multi-port optical devices has arisen. Such devices generally facilitate the implementation of new technology which increases the telecommunications capacity. For example, in effecting wavelength division multiplexed systems, three-port multiplexers for connecting sources with different wavelengths to a communication line, such as an optical fiber, are required. Additionally, the development of bidirectional transmission lines requires multi-port directional couplers which permit a terminal to receive a portion of a light signal while allowing the bulk of the signal to be transmitted to other terminals. More recently, all-optical, long distance communications systems have been proposed where fiber loss is periodically compensated by optical gain, such as from Raman or erbium amplifiers. Specifically this means that, in silica-based optical fiber, radiation of wavelength $\lambda_s$ can be amplified by means of pump radiation that is down-shifted in wavelength from $\lambda_s$ by a amount corresponding to shifts in wave number by about 100 to 600 cm$^{-1}$. In such systems, polarization insensitive, wavelength dependent directional couplers are required for injecting the down-shifted Raman pump radiation.

The traditional approach of combining individual bulk components such as mirrors, lenses, prisms, and the like are limited by their poor insertion loss, large size, weight, and high cost. In attempts to overcome these difficulties, various proposals have been made for providing three and four port devices, such as couplers, switches, and demultiplexers/multiplexers, which are less costly and more reliable and efficient than prior art devices. For example, U.S. Pat. No. 4,213,677 discloses the use of a beam splitter between two graded index lenses. An optical signal from a fiber coupled to one surface of a lens is partially reflected from the beam splitter back to a fiber coupled to the same surface and also partially transmitted to a fiber on the opposite surface of another lens. By controlling the reflectivity of the beam splitter, the splitting ratio of the incoming light between two output ports may be adjusted. Replacing the beam splitter with an interference filter, consisting of a number of thin film layers, converts the the optical device into a wavelength demultiplexer or multiplexer. While such devices perform acceptably, once the transmissive characteristics of the filter or splitter have been set, the optical functionality and properties of the devices are immutable. Moreover, the cost associated with the fabrication of an interference filter is relatively high due to the number of layers required to achieved the desired transmission property.

Exemplary of the optical devices affording wavelength selective coupling is U.S. Pat. No. 4,768,849. There, an optical resonant cavity comprising two parallel dielectric mirrors permits resonance in a selected band of channels. Optical signals from a main trunk are coupled to one of the mirrors at an end face of the resonant cavity and, moreover, are coupled from the one mirror to an output port of the main trunk by evanescent coupling. Those signals to be coupled are selected according to the resonant condition of the cavity. However, because coupling between input and output ports in the main trunk is accomplished by evanescent coupling, it is necessary to employ tapered waveguides within the coupling region of interest or non-tapered waveguides suspended in air, which cause significant fabrication difficulties.

It is therefore an object of the invention to provide an optical device which is economical and affords efficient coupling among transmission elements as well as affords ease of fabrication. It is a further object of the invention to provide such a device where the functionality may be conveniently and dynamically altered to suit a particular need. Finally, it is an object of the invention to provide an optical device which is substantially insensitive to polarization.

SUMMARY OF THE INVENTION

These and other objects of the invention are achieved in accordance with the invention which is a multiport optical device for transferring optical signals, or portion of optical signals, from one transmission element to another. The inventive optical device utilizes a pair of graded index (GRIN) lenses having an interposed Fabry-Perot etalon. Moreover, the functionality of the device may be modified by changing the transmission characteristics of the etalon, which may be effected by varying the optical path length and the reflectivies of the mirrors. In operation, the optical device uses the GRIN lenses as image transfer lenses between input and output ports, wherein the wavelength selectivity therebetween is afforded by the filtering mechanism associated with the Fabry Perot etalon. With the optical signals having an angle of incidence substantially normal to the Fabry Perot etalon, the optical device is relatively polarization insensitive.

In one exemplary embodiment, a pair of GRIN lenses are separated by a small gap, with each GRIN lens having an end surface coated with a reflective mirror such that the two mirrors and the cavity enclosed therein form a stable Fabry Perot etalon. In accordance with the principles of the invention, the functionality of this device is modified by varying the optical path length of the etalon. For example, the optical device may be used as a wavelength multiplexer or as an optical splitter. Moreover, by utilizing a piezoelectric transducer, the optical device may be converted to operate as an optical switch.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
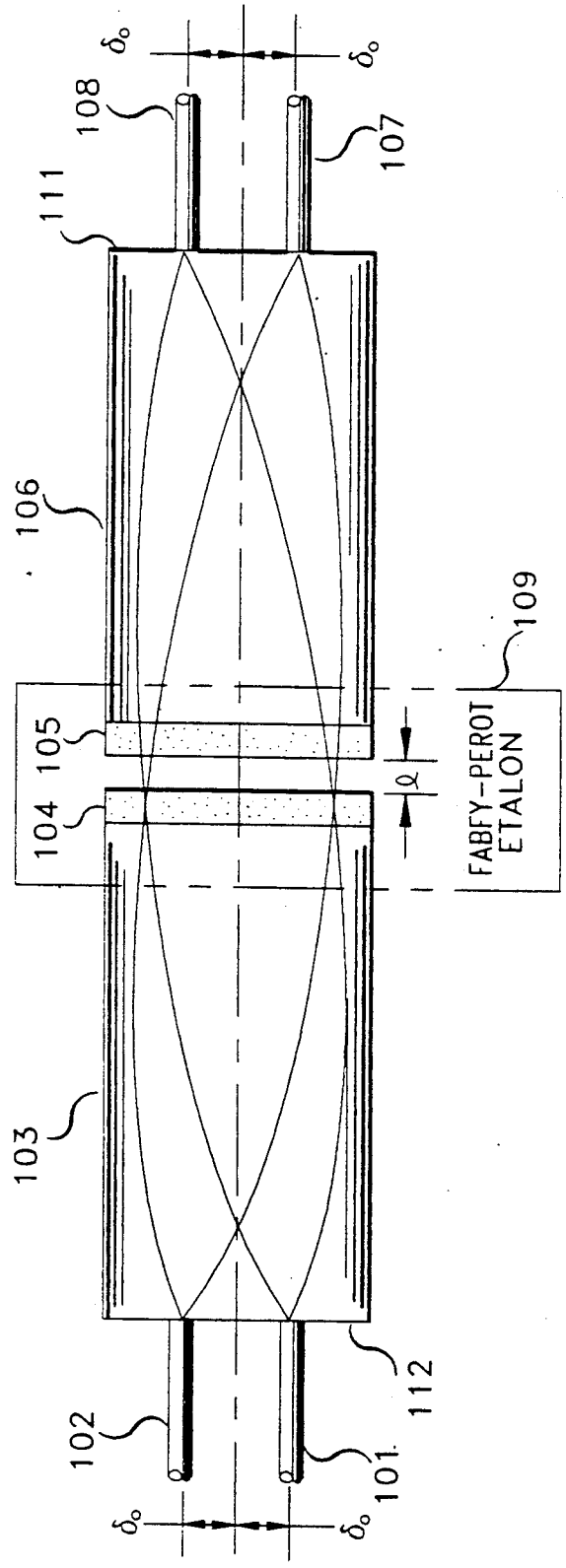
FIG. 1 shows an exemplary optical device in accordance with the principles of the invention.

A multi-port selective optical device in accordance with the teachings of this invention may be used for coupling, splitting, switching and demultiplexing/multiplexing optical signals. Shown in FIG. 1 is an exemplary multi-port optical device comprising ¼ pitch graded index (GRIN) lenses 103 and 106 which are positioned such that their center axes are colinear. GRIN lenses, which are well known in the art, are optical glass rods with a radial refractive index gradient. Generally, the radial index n(r) of commercially available GRIN lenses resembles a parabolic function given by $n(r) = n_o(1 - A \cdot r^2/2)$, where $n_o$ is the refractive index along the center axis, A is the lens profile constant and r is the radial coordinate. For a review of the basic properties of graded index lenses and their applications in communications systems, see W. J. Tomlinson, *Applied Optics*, Vol. 19, No. 7 (1980). Mirrors 104 and 105 coat an end surface of GRIN lenses 103 and 106, respectively, and, moreover, are separated by a distance, 1, so that Fabry Perot etalon 109 is formed therebetween. It should be understood, however, that the Fabry Perot etalon may instead be formed by bulk mirrors interposed between the GRIN lenses.

Optical fibers 101 and 102, which are positioned near end surface 112 at a distance, $\delta_o$, from the center axis, are in a symmetric relation thereto but perpendicular to end surface 112. In a similar manner, optical fibers 107 and 108 are positioned close to end face 111 at a distance, $\delta_o$, from the center axis of GRIN lens 106. In operation, optical device 100 uses the GRIN lenses as image transfer lenses between input and output ports, wherein wavelength selectivity therebetween is afforded by the filtering mechanism associated with the Fabry Perot etalon. In contradistinction to prior art devices utilizing graded index lenses, optical device 100 does not employ any passive or dispersive optical elements having immutable transmission characteristics, such as multilayer interference filters or beam splitters. Instead, the transmission characteristics of the etalon employed can be dynamically altered by changing the optical path length thereof and, consequently, the functionality of the optical device may be tailored to the desired need.

Optical signals that emanate from optical fibers 101 and 107, respectively, are incident on respective end surfaces 112 and 111. These incident optical signals propagate close to the optical axis, intersect the optical axis, and then propagate away from the optical axis. In other words, the optical signals propagate in an undulating manner. One pitch is defined as a periodic length of the GRIN lens through which an optical signal propagates until it reaches a position where the same positional and angular deviation from the center axis again occurs. It is well known in the art that the pitch, P, is related to the lens profile constant A as $P = 2\pi A^{-\frac{1}{2}}$.

Figure 2:
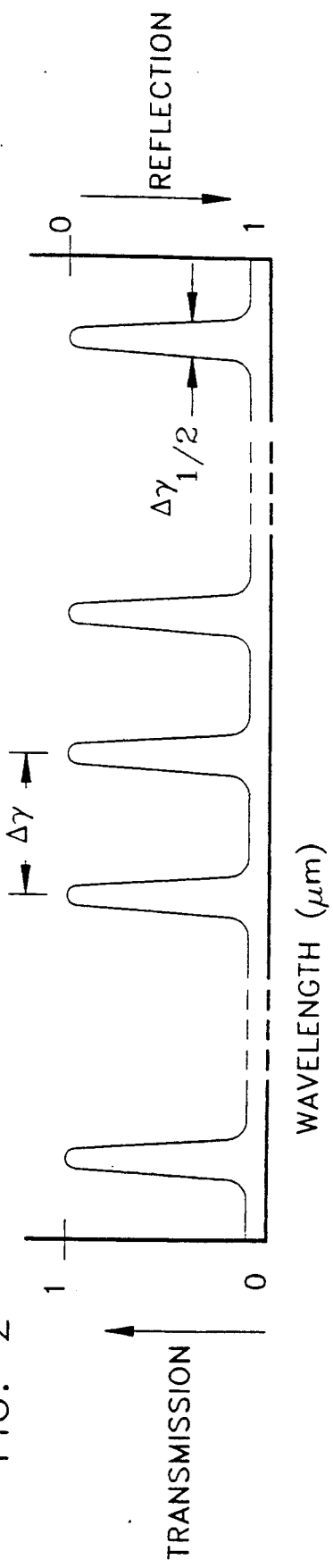
FIG. 2 shows the transmission and reflection characteristics of a typical Fabry Perot etalon.

Fabry Perot etalons have a transmission characteristic with peaks and nulls in the spectral domain which is dependent on the separation between the mirrors. It is contemplated that the transmission peaks of the etalon will be positioned according to the results desired therefrom. As illustrated in FIG. 2, the typical transmission/reflection versus frequency profile of a Fabry Perot etalon shows a separation, $\Delta \nu$, between the transmission peaks known as the "free spectral range". In particular, the "free spectral range" is related to the separation, 1, by the relationship $\Delta \nu = c/2l\cos\theta$, where c is the speed of light in vacuum and $\theta$ is the internal angle of incidence. It should be noted that the transmissivity, T, is related to the reflectivity, R, as $T = 1 - R$ and, moreover, is given by the following mathematical relationship:

$$T = \frac{1}{1 + \frac{4r}{(1-r)^2} \sin^2 \delta/2} \quad (1)$$

$$\delta = \frac{4\pi n l \cos\theta}{\lambda} \quad (2)$$

where $\lambda$ is vacuum wavelength of the incident light, r is the reflectivity of the mirrors and n is the refractive index of the medium enclosed between the mirrors. For a more detailed discussion of Fabry Perot etalons, see for example, the textbook "Principles of Optics", by Max Born et al., pp. 323-69 (1975). Additionally, it should be noted that the wavelength, $\lambda$, is related to the frequency, $\nu$, by the following relationship: $\lambda = c/\nu$. Hence, a reference made to wavelength is to be understood to encompass a reference in the alternative to frequency via the relationship above.

In this case, it is desired to couple an optical signal emanating from fiber 107 having a wavelength $\lambda_p$ to fiber 102 while allowing an optical signal emanating from fiber 101 having a wavelength $\lambda_s$ to be transmitted to optical fiber 102. In other words, optical signals in fibers 101 and 107 are to be multiplexed onto optical fiber 102. To this end, a transmission peak wavelength of Fabry Perot etalon 109 will be positioned to substantially coincident with the wavelength $\lambda_p$, while restricting wavelength $\lambda_s$ to lie within a transmission null region (a reflective region), called the "free spectral range region". A simple way to position the transmission peaks of the etalon is to change the cavity length, i.e., the spacing between mirrors 104 and 105, such as by a piezoelectric transducer. It should also be possible to adjust the transmission characteristic of the etalon by inducing a change in the refractive index of the optical medium enclosed within the etalon cavity.

Accordingly, the optical signal from fiber 101, which is incident on end surface 112, is converted into a parallel beam and intersects the optical axis at the surface of mirror 104 at an angle of incidence substantially normal to mirror 104. As such, polarization effects dependent on deviations from normal incidence become minimal. The optical signal is, then, reflected from mirror 104 due to the transmission characteristics of etalon 109 and coupled to optical fiber 102. Furthermore, the optical signal emanating from fiber 107 is efficiently coupled into optical fiber 102 because the combined length of lenses 103 and 106 is $\frac{1}{2}$ pitch, which affords a one to one imaging between the fibers. Similarly, it is apparent that incident light from fiber 108 having a wavelength, $\lambda_p$, may also be coupled into fiber 101. Accordingly, if optical signals at $\lambda_s$ are injected into fibers 101 and 102, and optical signals at $\lambda_p$ are injected into fibers 107 and 108, then it is possible to couple optical signals from fibers 101 and 107 into fiber 102 and, moreover, couple optical signals from fibers 108 and 102 into fiber 101.

By reciprocity, an optical signal comprising two wavelength components, $\lambda_s$ and $\lambda_p$, incident on end surface 112 from fiber 101 may be demultiplexed onto fibers 102 and 108, respectively. That is, light having a wavelength $\lambda_p$ will be coupled into fiber 108 while light having a wavelength $\lambda_s$ will be coupled into fiber 102. Thus, the optical device, shown in FIG. 1, may serve as both a wavelength multiplexer and demultiplexer with wavelength selectivity dependent on the transmission characteristic of the Fabry Perot etalon which can be varied by adjusting the separation between the GRIN lenses, i.e., the cavity length.

While in the above description, the optical signals have contained only a single wavelength component, it is contemplated that these signals could comprise a plurality of wavelength components. In such a case, however, the signals which are to be coupled from fiber 101 to fiber 102 should have wavelengths lying within a free spectral region of the etalon whereas those components which are to be coupled from fiber 107 to fiber 102 should lie within a transmission peak region. Given that the half-power width, $\nu_{\frac{1}{2}}$, for the transmission peaks is given by the below relationship, it should be possible to achieve the desired results through a judicious selection of the mirrors' reflectivity and the cavity length of the etalon:

$$\nu_{\frac{1}{2}} = \frac{c}{2nl\,F\cos\theta} \quad (3)$$

where F, called the Finesse, is given by $$\frac{\pi\sqrt{r}}{1-r}.$$

In the case where it is desired to tap-off, i.e., split, a certain percentage of optical power from fiber 101 to fibers 102 and 108, the optical device shown in FIG. 1 may be utilized for that purpose. The percentage of tap-off power will be determined by the ratio of transmissivity to reflectivity for the Fabry Perot etalon. For example, by varying the reflectivity of mirrors 104 and 105, it is possible to adjust the transmissivity and reflectivity of the etalon for a particular wavelength so that a predetermined percentage of an optical signal propagating in fiber 101 can be coupled into fiber 102, while the remaining power is coupled into fiber 108. It should, of course, be realized that the cavity length should be adjusted so that the desired transmission and reflection ratio is positioned at the desired wavelength.

In the manner described above, optical device 100 can perform various optical functions. It is further possible, however, for optical device 100 to serve as an optical switch. Light incident from optical fiber 101 may be switched between fiber 102 and fiber 108. For instance, utilizing a piezoelectric transducer, a transmission peak of the Fabry Perot etalon can be adjusted to be substantially equal to the wavelength of the light emanating from fiber 101. As such, the light will be efficiently coupled into fiber 108 as described aboveherein. However, by changing the cavity length of the etalon via the piezoelectric transducer so that the wavelength of the light emanating from fiber 101 lies within a free spectral range region, the light will instead be coupled into fiber 102.

The coupling loss between fibers 101 and 102, and fibers 107 and 102 will be predicated upon several factors, such as the cavity length, fiber offset $\delta_o$, numerical aperture of the lenses, as well as other factors. Lens aberration reduces the lens to fiber coupling and presents itself as an intrinsic loss in the optical device. Misalignment between the fibers and the GRIN lenses introduces an additional loss in the optical device. Ideally, the two $\frac{1}{4}$ pitch GRIN lenses should produce a one to one image between the input and output ports. It is expected that the alignment will be less sensitive to transverse offset than the angular tilt and the longitudinal position. In addition, the excess loss will depend strongly on the modal distribution of the light in the input fibers if multimode fibers are employed.

In the fabrication of the various optical devices, standard GRIN lenses may be utilized. For example, various GRIN lenses having the trademark name of SEL-FOC® may be purchased from Nippon Sheet Glass Co. While the embodiments abovehereing employed GRIN lenses having a $\frac{1}{4}$ pitch length, the various optical functions may be achieved so long as the length of the GRIN lenses are a positive odd integer multiple of $\frac{1}{4}$ pitch. Furthermore, it is contemplated that the mirrors coated on the end surfaces of the GRIN lenses may be formed by standard evaporation techniques. Particularly, the mirrors may consist of a metallic film, a dielectric film and the like.

In order to better understand the performance of the optical device 100, it is interesting to note the effects of various physical parameters. For example, in order to access the input and output ports, the input fibers are offset from the center axis by amount $\delta_o$ which causes a tilt $\phi$ in the collimated beam inside the Fabry Perot cavity, given by:

$$\sin\phi = \frac{\lambda \delta_o}{S_o^2 \pi n_L} \quad (4)$$

where $S_o$ and $n_L$ are the fundamental spot size and the maximum index of refraction of the GRIN lens, respectively. Unfortunately, this tilt introduces two sources of insertion loss: increased coupling loss at the output fiber and a loss due to the incomplete overlap of reflected beams within the cavity. Due to the tilt in the cavity beams, the beam path is displaced toward one side of the cavity with each successive reflection, i.e., "walkoff". The result is a resonant condition in which the beams existing in the cavity do not completely overlap and, thus, the efficiency of their interference is reduced. Moreover, this is manifested as a diminution in the peak transmissivity of the cavity's resonant wavelengths.

Based on Gaussian beam propagation model, the effects of different design parameters on coupling loss were examined with the express assumption that no transverse or angular misalignment existed. GRIN lenses 103 and 106 were modeled as $\frac{1}{4}$ pitch lenses having a 2 mm diameter, a numerical aperture of 0.16, a length of 16.3 mm and a lens profile constant $\sqrt{A}$ mm$^{-1}$ of 0.8964 at a wavelength of 0.83 $\mu$m. Additionally, the fiber offset, cavity length and reflectivity of the mirrors were set to 31.25 $\mu$m, 198 $\mu$m and 0.975, respectively. Assuming that light emanating from fiber 101 had a wavelength of 1.5 $\mu$m and a mode field radius of 5.2 $\mu$m, the "walk-off" loss and coupling loss were determined to be 0.15 and 0.16 db, respectively. Further simulations, indicated that maximizing the fundamental spot size, $S_o$, minimizes the tilt produced by the GRIN lens for a given fiber offset since the beams would have a larger area of overlapping. Clearly, it would therefore be desirable to use GRIN lenses that have a large $S_o$, i.e., small numerical aperture, in order to minimize insertion loss.

Since the reflectivity of the mirrors, which determines the finesse of the Fabry Perot etalon, is set by the system requirements, it is generally not a parameter that can be changed in order to minimize the coupling loss. However, calculations indicate that increasing the reflectivity increases the number of reflections in the cavity, leading to a greater "walk-off" and, thus, a greater total coupling loss. For instance, in the above example, increasing the mirrors' reflectivity from 0.975 to 0.99 increased the "walk-off" and coupling loss to 0.69 and 0.99 dB, respectively. With consideration to the length of the cavity, it is not surprising that longer cavities exhibit greater total loss since the beams have a greater physical distance to travel. However, it is anticipated that for lengths of less than 50 μm, the total coupling loss will be a few tenths of a dB, well within acceptable limits for most applications. It is further anticipated that using an index-matched cavity will allow the same optical path length, yet reduce the amount of "walk-off" since physically the cavity is smaller. Apposite to the consideration of loss are the effects of the fiber offset. From eq (4), it is evident that the tilt is determined, in large part, by the offset of the fibers. Hence, by reducing the fiber offset, the loss may be kept to a minimum. If for example, two fibers are placed side by side in a single glass ferrule and centered on the GRIN lens, the minimum achievable offset is one-half the diameter of the fiber.

It is contemplated that the present optical device will be useful in numerous applications in optical communications systems. For example, it may be used in bi-directional optical communications systems for coupling amplifier pump radiation onto a transmission fiber in order to compensate for fiber loss. Other applications will be readily obvious to those skilled in the art seeking a low cost, polarization insensitive, highly efficient device for coupling, demultiplexing/multiplexing or switching optical signals.

We claim:

1. An optical multiplexer comprising:
    first and second graded index lenses each having first and second surface ends;
    first and second transmission elements disposed on the first surface end of said first graded index lens, said first and second transmission elements being positioned such that the second transmission element receives at least a first optical signal from the first transmission element;
    a third transmission element disposed on the second surface end of said second graded index lens, the third transmission element being positioned such that the third transmission element receives at least a second optical signal from the first transmission element; and
    a Fabry Perot etalon interposed between the second and first surface ends of said first and second graded index lenses, respectively, said Fabry Perot etalon having a transmission characteristic such that the wavelength of said at least first optical signal substantially lies within a transmission peak region of said Fabry Perot etalon for transmitting said at least first optical signal from said first transmission element to said third transmission element and the wavelength of said at least second optical signal substantially lies within a free spectral range region of said Fabry Perot etalon for reflecting said at least second optical signal from said first transmission element to said second transmission element.

2. The optical multiplexer as defined in claim 1 further comprising means for varying the optical path length of said Fabry Perot etalon for tuning the transmission characteristic thereof so that the wavelength of a third optical signal substantially lies within a transmission peak region of said Fabry Perot etalon and the wavelengths of said first and second optical signals substantially lies within a free spectral range region of said Fabry Perot etalon.

3. The optical multiplexer as defined in claim 2 wherein said means for varying the optical path length of said Fabry Perot etalon includes a piezoelectric transducer.

4. The optical multiplexer as defined in claim 1 wherein said Fabry Perot etalon comprises first and second mirrors.

5. The optical multiplexer as defined in claim 4 wherein said first and second mirrors are disposed on said second and first surface ends of said first and second graded index lenses, respectively, whereby said first and second mirrors form said Fabry Perot etalon.

6. The optical multiplexer as defined in claim 5 wherein said first and second graded index lenses have substantially colinear center axes.

7. The optical multiplexer as defined in claim 6 wherein said first and second graded index lenses have an odd integer multiple pitch length of ¼.

8. The optical multiplexer as defined in claim 7 wherein at least one of said first and second mirrors includes a dielectric film.

9. The optical multiplexer as defined in claim 7 wherein at least one of said first and second mirrors includes a metallic film.

10. The optical multiplexer as defined in claim 7 wherein at least one of said first, second, and third transmission elements includes an optical fiber.

11. The optical multiplexer as defined in claim 7 wherein said first and second mirrors are separated by a distance less than 50 μm.

12. The optical multiplexer as defined in claim 7 wherein at least one of said first and second graded index lenses has a numerical aperture less than 0.25.

13. An optical splitter comprising;
    first and second graded index lenses each having first and second surface ends;
    first and second transmission elements disposed on the first surface end of said first graded index lens, said first and second transmission elements being positioned such that the second transmission element receives a first portion of an optical signal from the first transmission element;
    a third transmission element disposed on the second surface end of said second graded index lens, the third transmission element being positioned such that the third transmission element receives a second portion of said optical signal from the first transmission element; and
    a Fabry Perot etalon interposed between the second and first surface ends of said first and second graded index lenses, respectively, said Fabry Perot etalon having a transmission characteristic such that the wavelength of said optical signal substantially lies within a transmission peak region of said Fabry Perot etalon for transmitting said first portion of said optical signal from said first transmission element to said third transmission and for reflecting said second portion of said optical signal from said first transmission element to said second transmission element.

14. The optical splitter as defined in claim 13 further comprising means for varying the optical path length of said Fabry Perot etalon for tuning the transmission characteristic thereof so that the ratio of said first and second portions of said optical signal received by said second and third transmission elements, respectively, is adjusted to a predetermined value.

15. The optical splitter as defined in claim 14 wherein said means for varying the optical path length of said Fabry Perot etalon includes a piezoelectric transducer.

16. The optical splitter as defined in claim 13 wherein said Fabry Perot etalon comprises first and second mirrors.

17. The optical splitter as defined in claim 16 wherein said first and second mirrors are disposed on said second and first surface ends of said first and second graded index lenses, respectively, whereby said first and second mirrors form said Fabry Perot etalon.

18. The optical splitter as defined in claim 17 wherein said first and second graded index lenses have substantially colinear center axes.

19. The optical splitter as defined in claim 18 wherein said first and second graded index lenses have an odd integer multiple pitch length of $\frac{1}{4}$.

20. The optical splitter as defined in claim 19 wherein at least one of said first and second mirrors includes a dielectric film.

21. The optical splitter as defined in claim 19 wherein at least one of said first and second mirrors includes a metallic film.

22. The optical splitter as defined in claim 19 wherein at least one of said first, second, and third transmission elements includes an optical fiber.

23. The optical splitter as defined in claim 19 wherein said first and second mirrors are separated by a distance less than 50 μm.

24. The optical splitter as defined in claim 19 wherein at least one of said first and second graded index lenses has a numerical aperture less than 0.25.

25. An optical switch comprising:
first and second graded index lenses each having first and second surface ends;
first and second transmission elements disposed on the first surface end of said first graded index lens, said first and second transmission elements being positioned such that the second transmission element receives a first optical signal from the first transmission element when said optical device is in a first state;
a third transmission element disposed on the second surface end of said second graded index lens, the third transmission element being positioned such that the third transmission element receives said optical signal from the first transmission element when said optical device is in a second state;
a Fabry Perot etalon interposed between the second and first surface ends of said first and second graded index lenses, respectively; and
means for varying the optical path length of said Fabry Perot etalon for switching said optical switch between said first and second states, said first state corresponding to said Fabry Perot etalon having a transmission characteristic such that the wavelength of said optical signal substantially lies within a free spectral range region of said Fabry Perot etalon for reflecting said optical signal from said first transmission element to said second transmission element and said second second state corresponding to said Fabry Perot etalon having a transmission characteristic such that the wavelength of said optical signal substantially lies within a transmission peak region of said Fabry Perot etalon for transmitting said optical signal from said first transmission element to said third transmission element.

26. The optical switch as defined in claim 25 wherein said Fabry Perot etalon comprises first and second mirrors.

27. The optical switch as defined in claim 26 wherein said means for varying the optical path length of said Fabry Perot etalon includes a piezoelectric transducer.

28. The optical switch as defined in claim 27 wherein said first and second mirrors are disposed on said second and first surface ends of said first and second graded index lenses, respectively, whereby said first and second mirrors form said Fabry Perot etalon.

29. The optical switch as defined in claim 28 wherein said first and second graded index lenses have substantially colinear center axes.

30. The optical switch as defined in claim 29 wherein said first and second graded index lenses have an odd integer multiple pitch length of $\frac{1}{4}$.

31. The optical switch as defined in claim 30 wherein at least one of said first and second mirrors includes a dielectric film.

32. The optical switch as defined in claim 30 wherein at least one of said first and second mirror includes a metallic film.

33. The optical switch as defined in claim 30 wherein at least one of said first, second, and third transmission elements includes an optical fiber.

34. The optical switch as defined in claim 30 wherein said first and second mirrors are separated by a distance less than 50 μm.

35. The optical switch as defined in claim 30 wherein at least one of said first and second graded index lenses has a numerical aperture less than 0.25.

* * * * *